(12) United States Patent  
Matsuoka et al.

(10) Patent No.: US 7,930,527 B2  
(45) Date of Patent: Apr. 19, 2011

(54) INFORMATION PROCESSING APPARATUS AND TIME AND DATE INFORMATION CHANGE METHOD

(75) Inventors: Yoshio Matsuoka, Ome (JP); Takayuki Izumida, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 648 days.

(21) Appl. No.: 11/925,544

(22) Filed: Oct. 26, 2007

(65) Prior Publication Data

US 2008/0104409 A1    May 1, 2008

(30) Foreign Application Priority Data

Oct. 31, 2006   (JP) ................. 2006-296925

(51) Int. Cl.
*G06F 7/00* (2006.01)
*G06F 15/16* (2006.01)
*G06F 17/30* (2006.01)
*H04L 9/3218* (2006.01)

(52) U.S. Cl. ............... 713/1; 713/2; 713/167; 713/168; 705/2; 703/203; 726/28

(58) Field of Classification Search .................. 713/1, 2, 713/167, 168; 705/2; 709/203; 726/28
See application file for complete search history.

(56) References Cited

U.S. PATENT DOCUMENTS

| | | | | |
|---|---|---|---|---|
| 5,216,357 A * | 6/1993 | Coppola et al. | ............... | 324/142 |
| 6,470,449 B1 * | 10/2002 | Blandford | ............... | 713/178 |
| 6,772,361 B1 * | 8/2004 | Walsh | ............... | 713/502 |
| 6,938,178 B2 * | 8/2005 | Yano | ............... | 713/500 |
| 2002/0116658 A1 * | 8/2002 | Yano | ............... | 713/600 |
| 2005/0038757 A1 | 2/2005 | Wada | | |
| 2008/0010521 A1 * | 1/2008 | Goodrum et al. | ............... | 714/22 |

FOREIGN PATENT DOCUMENTS

| | | |
|---|---|---|
| JP | 11-194851 | 7/1999 |
| JP | 2003-273975 | 9/2003 |

* cited by examiner

*Primary Examiner* — Abdelmoniem Elamin
(74) *Attorney, Agent, or Firm* — Blakely, Sokoloff, Taylor & Zafman LLP

(57) ABSTRACT

According to one embodiment, an information processing apparatus includes a processor which executes an operating system and an application, a first real time clock including a function of supplying time and date information to the operating system at a time when the operating system is booted, and an alarm function of booting the operating system at a set time and date, a second real time clock including a function of measuring a time and date, and a time and date information transmission processing unit which executes authentication processing and which executes processing of transmitting information to change the time and date measured by the second real time clock in a case where the authentication processing has been successful.

18 Claims, 9 Drawing Sheets

INFORMATION PROCESSING APPARATUS AND TIME AND DATE INFORMATION CHANGE METHOD

CROSS-REFERENCE TO RELATED APPLICATIONS

This application is based upon and claims the benefit of priority from Japanese Patent Application No. 2006-296925, filed Oct. 31, 2006, the entire contents of which are incorporated herein by reference.

BACKGROUND

1. Field

One embodiment of the present invention relates to an information processing apparatus having a real time clock which cannot easily be tampered, and a time information change method.

2. Description of the Related Art

Usually, time and date information of a personal computer is managed with a real time clock (RTC). Since the real time clock can easily be accessed by standard I/O of the computer, even a general user can easily change the time and date information. Therefore, when any countermeasure is not taken, the time and date information of the RTC is easily tampered. Therefore, use of the time and date information of the RTC for a security application involves risk.

In Jpn. Pat. Appln. KOKAI Publication No. 11-194851, a technology having two RTCs is disclosed for the purpose of improving the precision of time.

According to the above technology, in order to improve the precision of the RTC to be accessed by a CPU, another RTC having a high precision is prepared, and the time information of the RTC having the high precision is copied in the RTC. Therefore, the precision of the time information of the RTC can be kept, but any countermeasure against the tampering of the time information is not considered.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus comprises a processor which executes an operating system and an application, a first real time clock including a function of supplying time and date information to the operating system at a time when the operating system is booted, and an alarm function of booting the operating system at a set time and date, a second real time clock including a function of measuring a time and date, and a time and date information transmission processing unit which executes authentication processing and which executes processing of transmitting information to change the time and date measured by the second real time clock in a case where the authentication processing has been successful.

An embodiment of the present invention will hereinafter be described with reference to the drawings.

First, a constitution of an information processing apparatus according to one embodiment of the present invention will be described with reference to FIGS. 1 and 2. This information processing apparatus is realized as a portable notebook-size personal computer 10 which can be driven with a battery.

Figure 1:
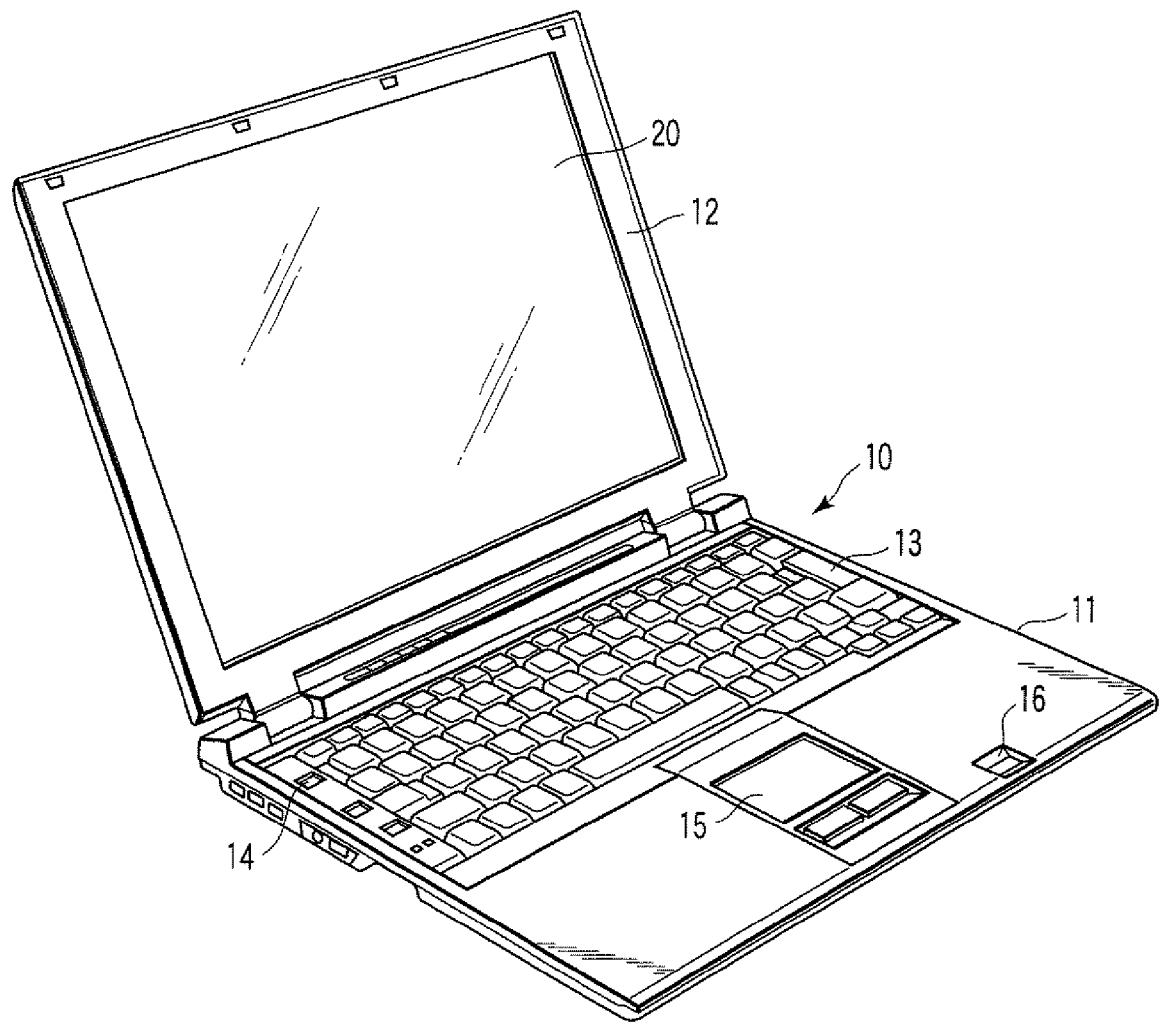
FIG. 1 is an exemplary perspective view as seen from the front showing an appearance of an information processing apparatus according to one embodiment of the present invention.

FIG. 1 is a perspective view of the computer 10 viewed from the front in a state in which a display unit is opened.

The present computer 10 includes a computer main body 11 and a display unit 12. A display device including a liquid crystal display (LCD 20) is incorporated in the display unit 12, and a display screen of the LCD 20 is positioned substantially at the center of the display unit 12.

The display unit 12 is supported by the computer main body 11, and attached to the computer main body 11 so as to be rotatable between an open position where an upper surface of the computer main body 11 is exposed and a closed position where the upper surface of the computer main body 11 is closed. The computer main body 11 has a thin box-like housing. On the upper surface of the body, a keyboard 13, a power button 14 for turning on/off a power supply of the computer 10 and a touch pad 15 are arranged. Furthermore, a fingerprint sensor 16 is disposed on the upper surface of the computer main body 11. The fingerprint sensor 16 is a sensor for detecting a user's fingerprint.

Figure 2:
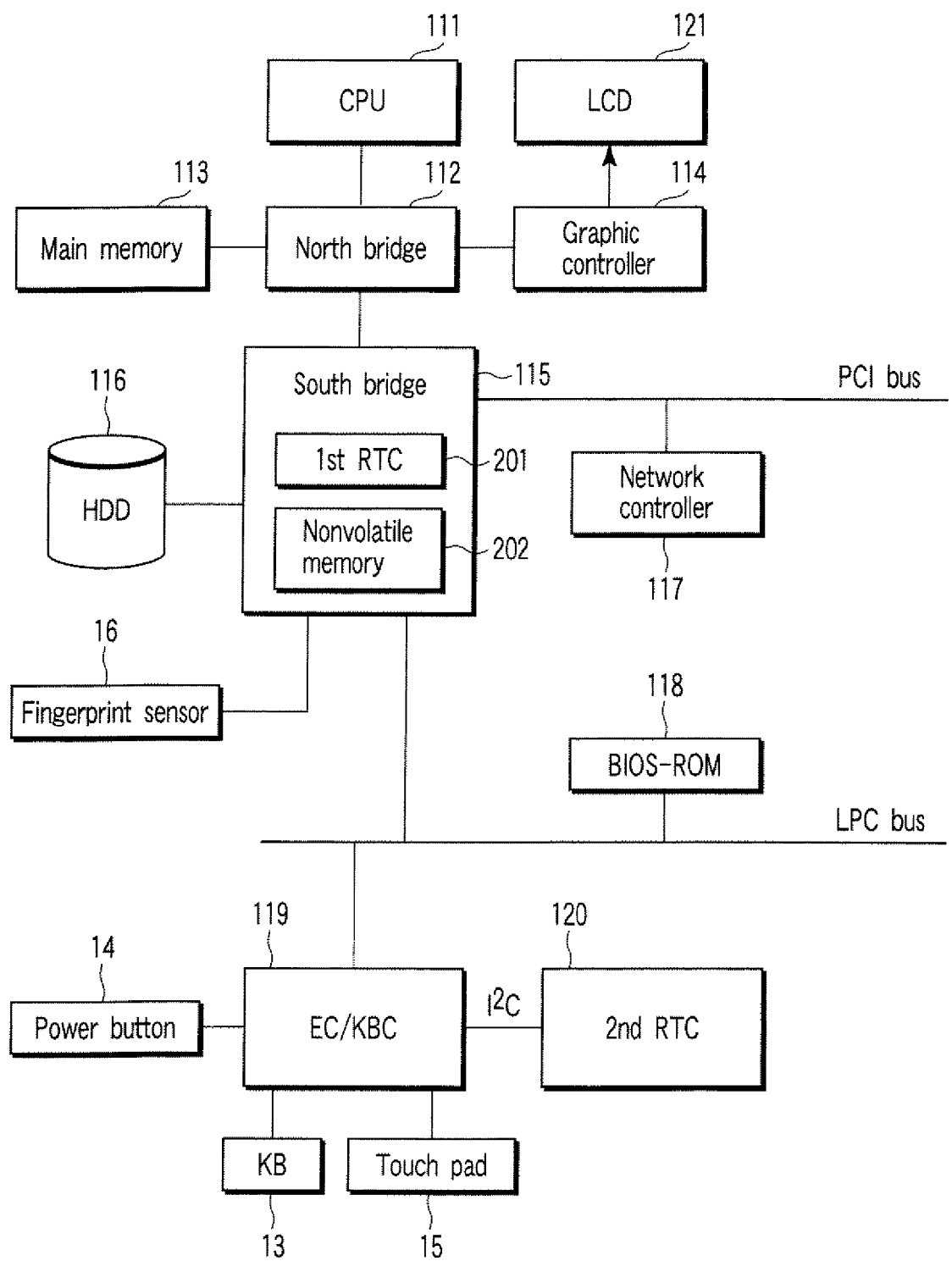
FIG. 2 is an exemplary block diagram showing a system constitution of the information processing apparatus of FIG. 1.

FIG. 2 shows one example of a system constitution of the present computer 10.

The present computer 10 includes a CPU 111, a north bridge 112, a main memory 113, a graphic controller 114, a south bridge 115, a hard disk drive (HDD) 116, a network controller 117, a flash BIOS-ROM 118, an embedded controller/keyboard controller IC (EC/KBC) 119, a second real time clock (2nd RTC) 120 and the like.

The CPU 111 is a processor which controls operations of components of the computer 10. This CPU 111 executes an operating system and various application programs/utility programs to be loaded from the HDD 116 to the main memory 113. The CPU 111 also executes a basic input output system (the system BIOS) stored in the flash BIOS-ROM 118. The system BIOS is a program for hardware control.

The north bridge 112 is a bridge device which connects a local bus of the CPU 111 to the south bridge 115. The north bridge 112 also has a function of executing communication with the graphic controller 114 via an accelerated graphic port (AGP) bus and the like. Furthermore, in the north bridge 112, a memory controller which controls the main memory 113 is also incorporated.

The graphic controller 114 is a display controller which controls an LCD 121 for use as a display monitor of the present computer 10. The south bridge 115 is connected to a peripheral component interconnect (PCI) bus and a low pin count (LPC) bus, respectively.

Moreover, in the south bridge 115, a first real time clock (1st RTC) 201 and a nonvolatile memory 202 are incorporated. The first real time clock (1st RTC) 201 is a time module which measures a time and date. The first real time clock (1st RTC) 201 is operated by a battery for exclusive use in the first real time clock (1st RTC) 201 even in a period when the power of the present computer 10 is turned off.

The embedded controller/keyboard controller IC (EC/KBC) 119 is a one-chip microcomputer in which an embedded controller for managing the power supply and a keyboard controller to control the keyboard (KB) 13, the touch pad 15 and the like are integrated. The embedded controller/keyboard controller IC 119 cooperates with a power supply circuit to turn on or off the power supply of the computer 10 in response to a user's operation of the power button switch 14. The power supply circuit generates a system power supply to be supplied to the components of the computer 10 by use of a battery or an external power supply to be supplied via an AC adapter.

The second real time clock (2nd RTC) 120 is a time module which measures the time and date. The second real time clock (2nd RTC) 120 is operated by a battery for exclusive use in the second real time clock (2nd RTC) 120 even in a period when the power of the computer 10 is turned off. It is to be noted that the first real time clock (1st RTC) 201 and the second real time clock (2nd RTC) 120 may be operated by the same battery. The second real time clock (2nd RTC) 120 is connected to the EC/KBC 119 via an I2C bus.

The first real time clock (1st RTC) 201 and the second real time clock (2nd RTC) 120 may be driven by different batteries to drive the respective RTCs 201, 120 for a long time.

Figure 3:
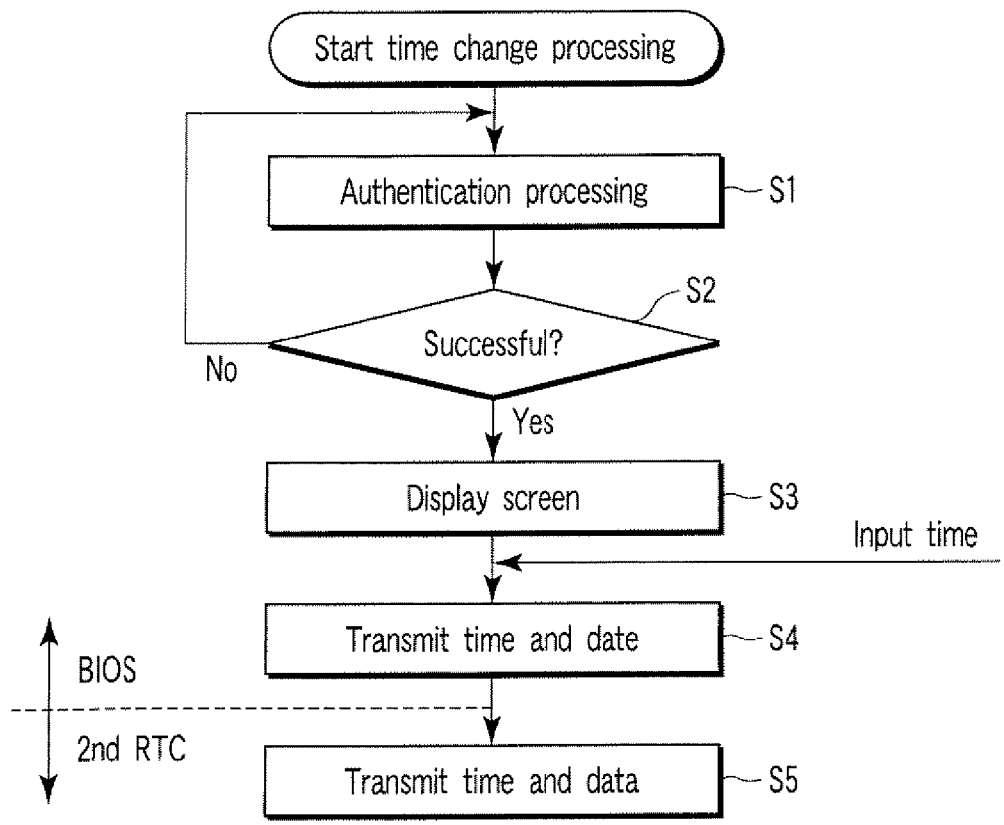
FIG. 3 is an exemplary flow chart showing a procedure of processing for changing time information of a second real time clock to be mounted on the information processing apparatus of FIG. 1.

A way of correcting a time and date measured by the second real time clock (2nd RTC) 120 will be described. Time and date information of the second real time clock (2nd RTC) 120 is used in processing of security. Therefore, the time and date measured by the second real time clock (2nd RTC) 120 can be changed in a case where authentication processing has successfully been executed. A way of changing the time and date information of the 2nd RTC 120 will be described with reference to FIG. 3. FIG. 3 shows the way of changing the time information of the real time clock according to one embodiment of the present invention.

First, the system BIOS executes the authentication processing (step S1). When the authentication processing has not been successful, that is, when input authenticating information has not matched with registered authenticating information (NO in the step S1), the step does not advance to the next processing. In consequence, so long as the authentication processing is not successful, the change of the time information of the 2nd RTC 120 is prohibited.

After the authentication processing has been successful, that is, after it has been detected that the input authenticating information matches with the registered authenticating information (YES in the step S1), the system BIOS displays, in the LCD 121, a screen for changing the time information of the 2nd RTC 120. Here, the input authenticating information includes a password input from the keyboard 13 by the user, fingerprint information supplied from the fingerprint sensor 16, an authentication code supplied from a time and date information change tool of exclusive hardware, and the like.

When the user inputs a new time and date, the system BIOS transmits the new time and date information to the EC/KBC 119, and the 2nd RTC 120 via the I2C bus (step S4). The 2nd RTC 120 sets the time information transmitted from the system BIOS as the new time and date information (step S5).

According to the above processing, the time and date information of the 2nd RTC 120 can be changed. The time and date information of the 2nd RTC 120 cannot be changed until the authentication processing of the step S1 is successful. Therefore, the time and date information of the 2nd RTC 120 can be prevented from being tampered.

It is to be noted that when the operating system or an application operated on the operating system uses the time information of the 2nd RTC 120, the time and date information is supplied via the BIOS, the EC/KBC and the I2C bus.

An example in which the time information of the 2nd RTC 120 is used in a security application will hereinafter be described.

Figure 4:
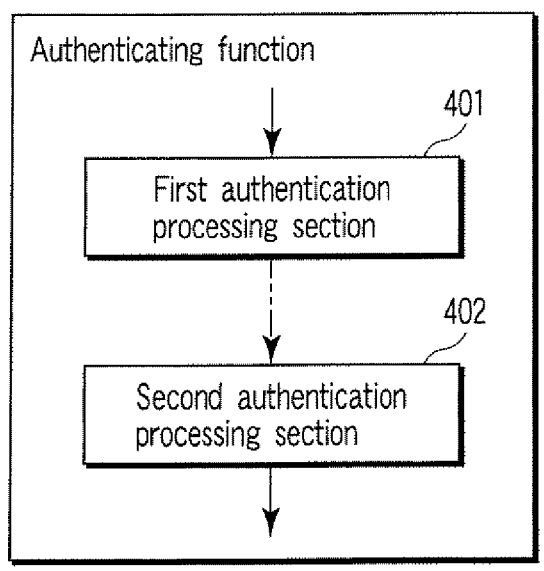
FIG. 4 is an explanatory view of an authenticating function to be mounted on the information processing apparatus of FIG. 1.

First, an authenticating function mounted on the computer 10 will be described with reference to FIG. 4.

On the present computer 10, a first authentication processing unit 401 and a second authentication processing unit 402 are mounted. The first authentication processing unit 401 executes first authentication processing for confirming validity of the user in response to the turning-on of the power supply of the present computer 10.

This first authentication processing is authentication processing to be executed before a system program such as the operating system is booted. The first authentication processing is realized by, for example, BIOS authentication processing executed by the system BIOS. In a case where the authenticating information (a user password or biological information such as a fingerprint) is beforehand registered in the present computer 10, the system BIOS requests the user to input the authenticating information at a time when the power of the present computer 10 is turned on. The system BIOS compares the authenticating information input by the user's operation of an input unit (the keyboard 13 or the fingerprint sensor 16) with the beforehand registered authenticating information, whereby it is judged whether or not the user is a valid user who can use the present computer 10. In a case where it is judged that the user is the valid user, the system BIOS permits execution of boot-up processing of the operating system or the like. All operations including the boot-up processing and the like are prohibited by the system BIOS until it is judged that the user is the valid user. Therefore, even if the present computer 10 is stolen, the present computer 10 can be protected from illegal use by the first authentication processing.

The user password is sometimes referred to as a BIOS password. The registration of the user password is executed by a setup function provided by the system BIOS, or a utility program for exclusive use. The registered user password is stored in the BIOS-ROM 118, the nonvolatile memory 202 or the like. The registration of biological information such as the fingerprint is also executed by the setup function provided by the system BIOS, or the utility program for exclusive use.

The second authentication processing unit 402 executes second authentication processing for confirming the validity of the user after the execution of the first authentication processing. The second authentication processing is the authentication processing to be executed after the first authentication processing has been successful. The second authentication processing is realized by, for example, log-on authentication processing for judging whether or not the user is a user who can log on (or log in) the operating system. This log-on authentication processing is executed by the operating system.

It is to be noted that the second authentication processing is not limited to the log-on authentication processing. For example, when the power of the present computer 10 is turned on, that is, before the operating system is booted, two authentication processing of the first authentication processing and the second authentication processing may be executed. In this case, in the first authentication processing, the system BIOS executes, for example, BIOS password authentication processing, and in the second authentication processing, the system BIOS executes, for example, BIOS biological authentication processing.

In the BIOS password authentication processing, the system BIOS compares the user password beforehand registered in the present computer 10 with the password typed and input by the user, to confirm the validity of the user based on the comparison result. When the BIOS password authentication processing has been successful, the BIOS biological authentication processing is executed.

In the BIOS biological authentication processing, the system BIOS compares the fingerprint beforehand registered in the present computer 10 with the user's fingerprint input by the user using the fingerprint sensor 16, to confirm the validity of the user based on the comparison result. When the validity of the user is confirmed, the execution of the boot-up processing of the operating system and the like is permitted.

As described above, the authentication processing at a time when the power is turned on is remarkably effective to protect the present computer 10 from illegal use. To some users, however, it may be troublesome that an authenticating action is performed every time the power is turned on.

To solve the problem, the present computer 10 is provided with a new function for improving usability while maintaining an effect of preventing the illegal use. This function will hereinafter be referred to as an antitheft protection timer function.

This antitheft protection timer function is a function of skipping the execution of the first authentication processing at a time when the power is turned on until a predetermined period elapses from the last success of the second authentication processing. That is, in a case where an elapsed time from the time when the second authentication processing has lastly been successful to the time when the power of the present computer 10 has next been turned on does not exceed the predetermined period, the execution of the first authentication processing is automatically omitted, and it is regarded that the first authentication processing has been successful.

In a case where the time elapsed from the last success of the second authentication processing exceeds the predetermined period and then the power of the present computer 10 is turned on, the first authentication processing is executed as usual, and the user is requested to input the password and the like.

So long as the valid user uses the present computer 10, for example, every day or at a frequency of once in several days, the first authentication processing is not executed even when the power of the present computer 10 is turned on. Therefore, the user can use the present computer 10 only by undergoing the second authentication processing.

If the present computer 10 is stolen and the elapsed time from the last success of the second authentication processing exceeds the predetermined period, the first authentication processing is executed when the power of the present computer 10 is turned on. The present computer 10 cannot be used so long as the same authenticating information as the registered authentication processing (the user password or biological information such as the fingerprint) is not input.

In a case where the time elapsed from the last success of the second authentication processing exceeds the predetermined period in this manner, any person other than the valid user cannot use the present computer 10. Therefore, the antitheft protection timer function can not only improve the usability but also contribute to prevention/inhibition of an action of stealing and reselling the computer or the like.

Figure 5:
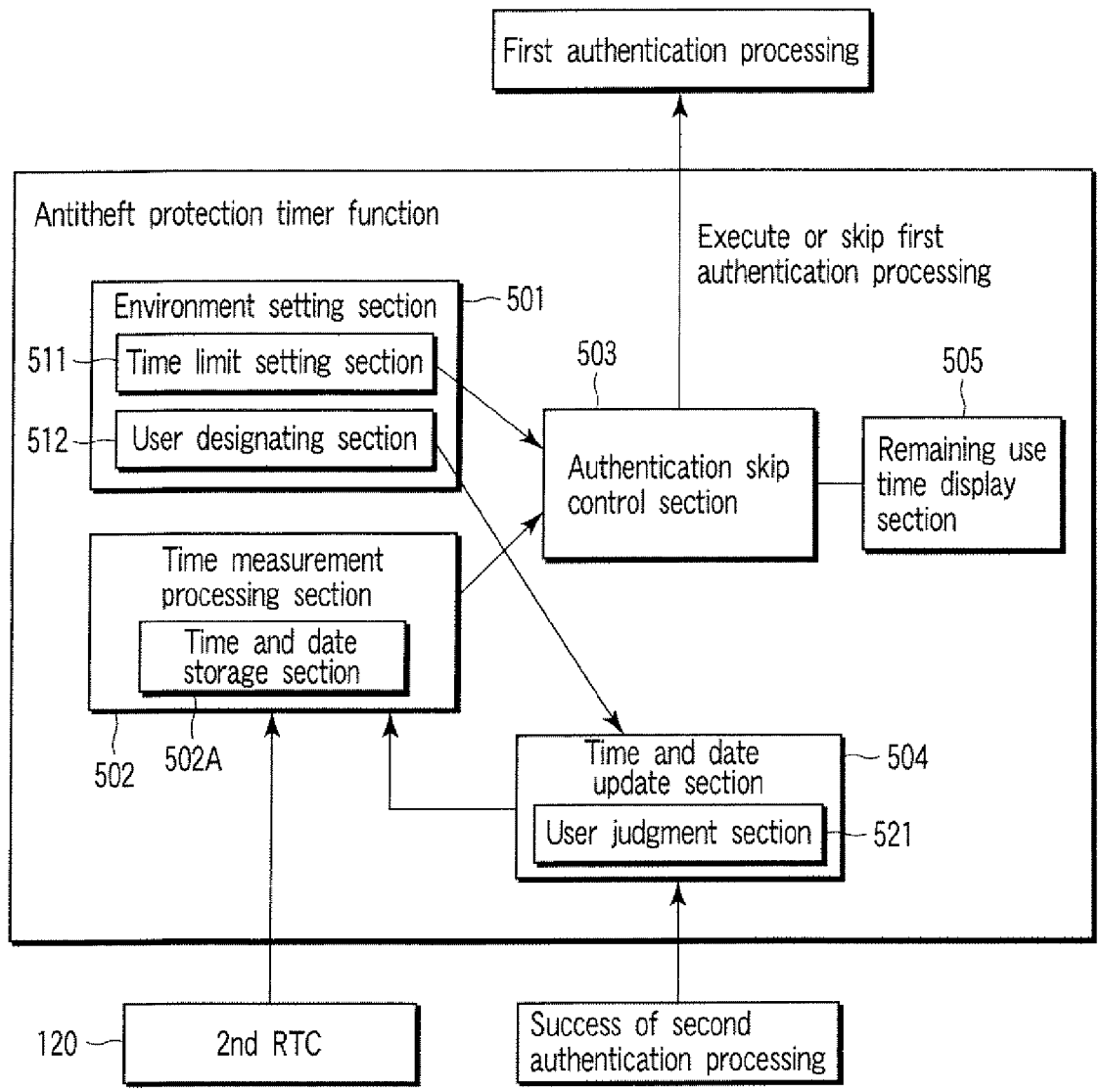
FIG. 5 is an explanatory view of an antitheft protection timer function provided in the information processing apparatus of FIG. 1.

Next, a constitution of a function for realizing the antitheft protection timer function will be described with reference to FIG. 5.

The antitheft protection timer function is realized by an environment setting unit 501, a time measurement processing unit 502, an authentication skip control unit 503, a time and date update unit 504 and a remaining use time display unit 505.

The environment setting unit 501 sets an operation environment concerning the antitheft protection timer function in response to a user's operation. This environment setting unit 501 includes a time limit setting unit 511 and a user designating unit 512. The time limit setting unit 511 sets time limit information which designates the above-mentioned predetermined period in response to the user's operation. A time limit (L) which can be designated based on the time limit information is in a range of, for example, one day to 28 days. The environment setting unit 501 is realized by a utility program.

The time measurement processing unit 502 executes processing for measuring the time elapsed from last success of the second authentication processing. This processing is executed using a time and date stored in a time and date storage unit 502A and a time and date measured with the second real time clock (2nd RTC) 120. In the time and date storage unit 502A, a time and date when the second authentication processing has been successful is stored. Every time the second authentication processing has been successful, a new time and date is stored as a value of the time and date storage unit 502A by the time and date update unit 504. Then, the time measurement processing unit 502 calculates a difference between a time and date (B) of the second real time clock (2nd RTC) 120 and a time and date (A) stored in the time and date storage unit 502A, whereby an elapsed time D (D=B−A) from a time A when the second authentication processing has lastly been successful to a time when the power of the present computer 10 has next been turned on is indicated.

When the power of the present computer 10 is turned on, the authentication skip control unit 503 judges whether or not the elapsed time D from the last success of the second authentication processing to the present time exceeds the time limit (L). When the elapsed time D does not exceed the time limit (L), the execution of the first authentication processing is skipped. The judgment of whether or not the elapsed time D from the last success of the second authentication processing to the present time exceeds the time limit (L) is executed by comparing the time calculated by the time and date processing unit 502 with the time limit (L). The authentication skip control unit 503 is realized by, for example, the system BIOS.

As described above, the time and date update unit 504 changes contents of the time and date storage unit 502A every time the second authentication processing has been successful.

The time and date update unit 504 may be provided with a user judgment unit 521. The user judgment unit 521 judges whether or not the user authenticated by the second authentication processing is a user who has specific authority. The user who has the specific authority is designated beforehand by the user designating unit 512 of the environment setting unit 501. In a case where the user authenticated by the second authentication processing is the user designated beforehand by the user designating unit 512, the user judgment unit 521 judges that the user authenticated by the second authentication processing is the user who has the specific authority. In a case where conditions that the second authentication processing is successful and the user authenticated by the second authentication processing is the user who has the specific authority are established, a time and date when the conditions are established is stored in the time and dale storage unit 502A by the time and date update unit 504.

The time and date update unit 504 is realized by the system BIOS and/or the utility program.

The remaining use time display unit 505 displays a remaining time until the elapsed time D from the last success of the second authentication processing reaches the time limit L as a remaining use time (or the number of remaining use days) of the present computer 10 in the LCD 121 or the like. The remaining use time is displayed in order to notify the third party that the number of the use days is limited even in a case where the present computer 10 is stolen. In consequence, a constant crime prevention effect can be obtained.

Figure 6:
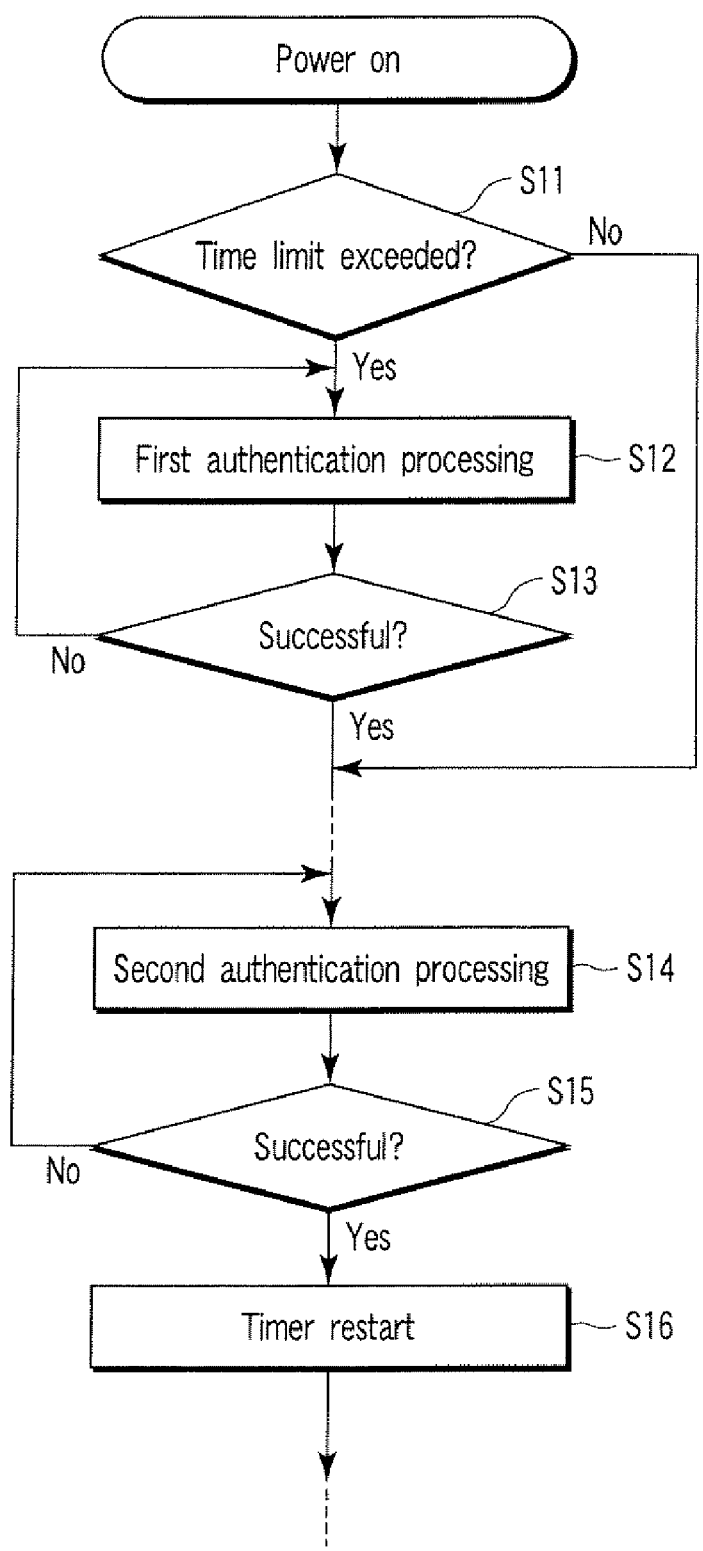
FIG. 6 is an exemplary flow chart showing a basic procedure of authentication control processing to be executed by the information processing apparatus of FIG. 1.

Next, a basic procedure of authentication control processing by use of the antitheft protection timer function will be described with reference to a flow chart of FIG. 6.

When the power of the present computer 10 is turned on, the system BIOS judges whether or not the elapsed time D from the last success of the second authentication processing to the present time exceeds the time limit L (step S11).

When the elapsed time D exceeds the time limit L (YES in the step S11), the first authentication processing is executed (step S12). When the first authentication processing has not been successful, that is, when the authenticating information input by the user has not matched with the registered authenticating information (NO in step S13), the step does not advance to the next processing. In consequence, the use of the present computer 10 is prohibited until the first authentication processing is successful.

After the first authentication processing has been successful, that is, after it has been detected that the authenticating information input by the user matches with the registered authenticating information (YES in the step S13), the second authentication processing is executed (step S14). When the second authentication processing has been successful (step S15), a value of the timer is reset, and a time measuring operation of the timer is restarted (step S16).

On the other hand, when the elapsed time D does not exceed the time limit L (NO in the step S11), the execution of the first authentication processing is skipped. In consequence, the user does not have to input the authenticating information for the first authentication processing.

Next, a specific example of a procedure of the authentication control processing will be described with reference to a flow chart of FIG. 7. Here, as the second authentication processing, a case where the above-mentioned log-on authentication processing is used is assumed.

Figure 8:
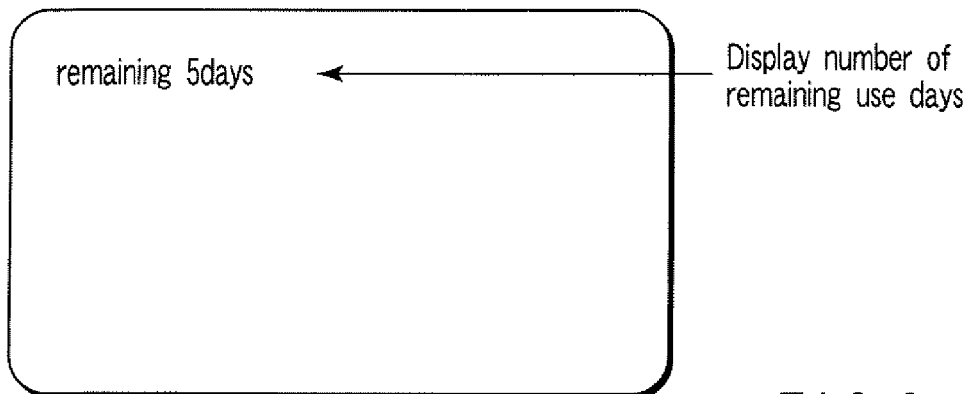
FIG. 8 is an exemplary diagram showing an example of a boot-up screen for use in the information processing apparatus of FIG. 1.
Figure 9:
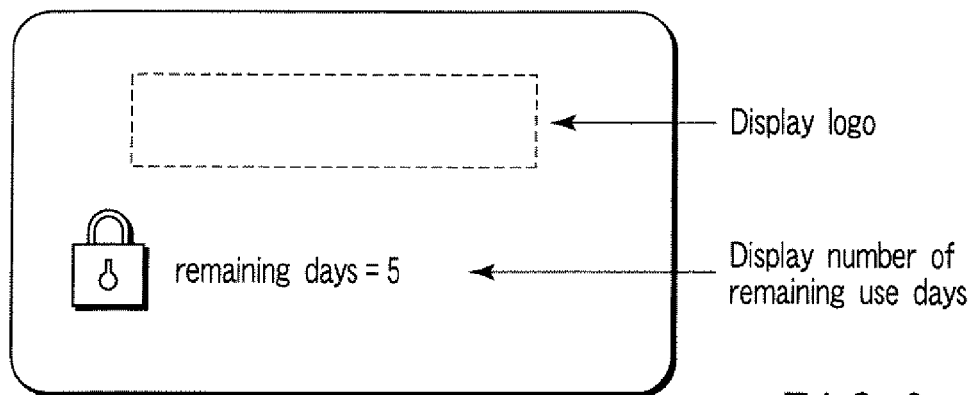
FIG. 9 is an exemplary diagram showing another example of the boot-up screen for use in the information processing apparatus of FIG. 1.

When the power of the present computer 10 is turned on, the system BIOS first displays, in the LCD 121, a boot-up screen which indicates the remaining use time (the number of the remaining use days) of the present computer 10 (step S101) FIGS. 8, 9 show examples of the boot-up screen. The boot-up screen of FIG. 8 displays the number of the remaining use days based on text data. For example, when the number of the remaining use days is five, a message "remaining 5 days" is displayed based on the text data. The boot-up screen of FIG. 9 displays the number of the remaining use days and an icon of, for example, a pattern of a key together with a logo image concerning a vender of the computer or the like.

After the boot-up screen of FIG. 8 or 9 is displayed, the system BIOS acquires a calculation result D of the time and date processing unit 502 to compare a calculated value D of the time and date processing unit 502 with the time limit L (step S102). According to a comparison result of the calculated value D of the time and date processing unit 502 with the time limit L, the system BIOS judges whether or not the time elapsed from the last success of the second authentication processing (here, the log-on authentication processing) exceeds the time limit L (step S103).

In a case where the time elapsed from the last success of the second authentication processing exceeds the time limit L (YES in the step S103), the system BIOS displays, in the LCD 121, an authentication screen which requests the input of the user password to execute the first authentication processing, and the user is requested to input the user password (step S104). In this authentication screen, a text message (PASSWORD=) which requests the input of the user password is displayed. For example, the text message (PASSWORD=) may be displayed in the boot-up screen of FIG. 8.

When the user types and inputs the user password (step S105), the system BIOS compares the typed and input user password with the registered user password to judge whether or not the typed and input user password is correct (step S106).

When the typed and input user password matches with the registered user password, that is, when the typed and input user password is correct (YES in the step S106), the system BIOS starts a boot sequence for booting an operating system (step S107).

On the other hand, in a case where the time elapsed from the last success of the second authentication processing does not exceed the time limit L (NO in the step S103), the system BIOS skips the steps S104, S105 and S106 and advances to the step S107 in order to omit the execution of the first authentication processing.

When the operating system is booted, in order to execute the second authentication processing, the operating system displays a log-on authentication screen in the LCD 121 to request the typing input of a user name and a log-on password (step S108). When the log-on password has been correct, that is, when the second authentication processing has been successful (YES in step S110), the operating system boots processing to set an operation environment corresponding to the user who has logged on the system. In a case where the utility program which operates on the operating system detects that the second authentication processing has been successful, the program cooperates with the system BIOS to execute processing to update the value of the time and date storage unit 502A (step S111). In this step S111, the utility program notifies the system BIOS that the log-on authentication has been successful. The system BIOS updates the stored value of the time and date storage unit 502A.

After the update of the time and date storage unit 502A, the operating system starts usual processing (step S112).

The setting of the time limit information is executed by the utility program. The user starts the utility program to input the value of the time limit L (step S201). The utility program stores the input value of the time limit L in the nonvolatile memory 202 or the like (step S202).

Figure 10:
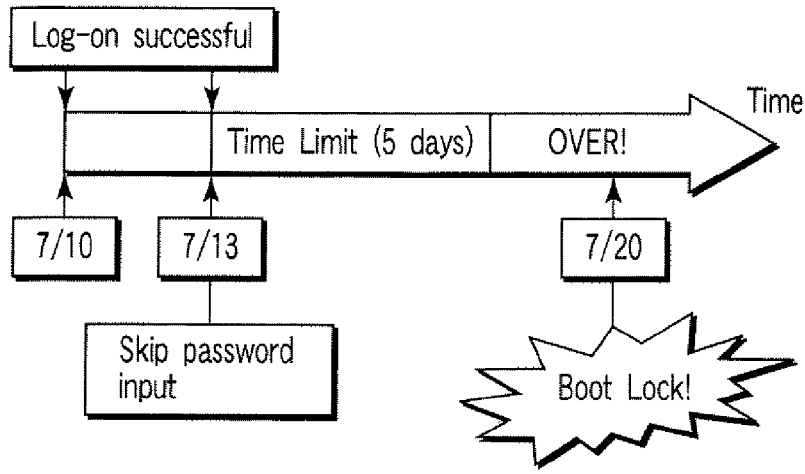
FIG. 10 is an exemplary diagram schematically showing an operation of the antitheft protection timer function provided in the information processing apparatus of FIG. 1.

FIG. 10 schematically shows an operation of the antitheft protection timer function.

In FIG. 10, it is assumed that the time limit is five days. If a date when the user has lastly succeeded in the log-on authentication is July 10 and if the user turned on the power of the present computer 10 on July 13, the first authentication processing is skipped. Then, when the user succeeds in the log-on authentication, the time and date information to be stored in the time and date storage unit 502A is updated. Afterward, if any log-on authentication has not been performed and when the power of the present computer 10 has been turned on July 20, the first authentication processing is executed. Therefore, the third party cannot operate the computer 10.

Figure 11:
FIG. 11 is an exemplary diagram showing an example of an operation environment setting screen for use in the information processing apparatus of FIG. 1.

FIG. 11 shows an example of an operation environment setting screen concerning the antitheft protection timer function.

In this operation environment setting screen, there are displayed a check box 601 to designate whether to validate/invalidate the antitheft protection timer function, an input field 602 to designate the time limit (the limited number of the days) and a field 603 for designating the user who has authority to update the contents of the time and date storage unit 502A.

In the field 603, a list of names of users who can log on the operating system is displayed. A check box is displayed for each user name. The user checks the check box, whereby the user who has the authority to update the contents of the time and date storage unit 502A can be designated. The user names of the users who have the authority to update the contents of the time and date storage unit 502A are stored as a user name list in the nonvolatile memory 202.

Figure 7:
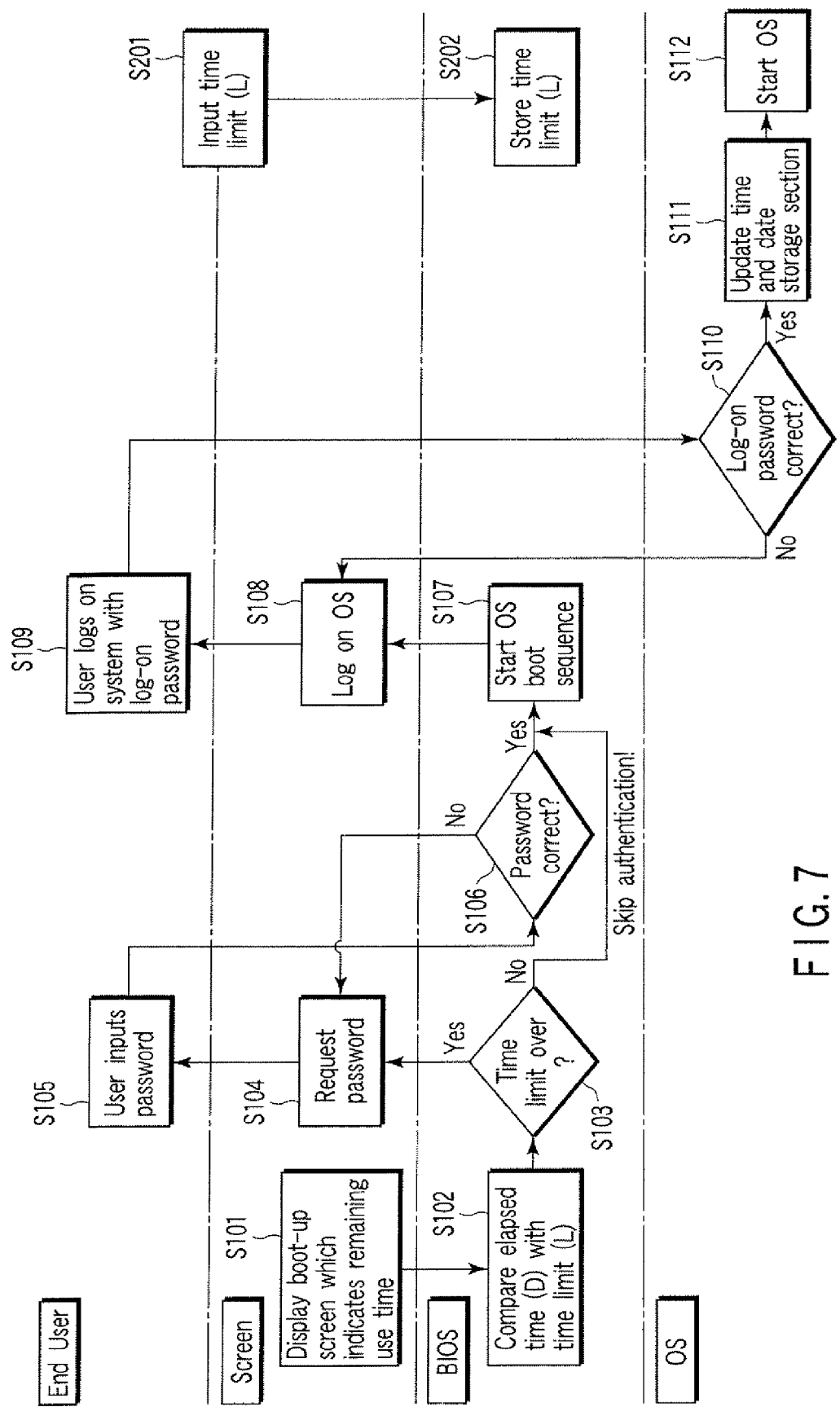
FIG. 7 is an exemplary flow chart showing a specific example of a procedure of the authentication control processing to be executed by the information processing apparatus of FIG. 1.
Figure 12:
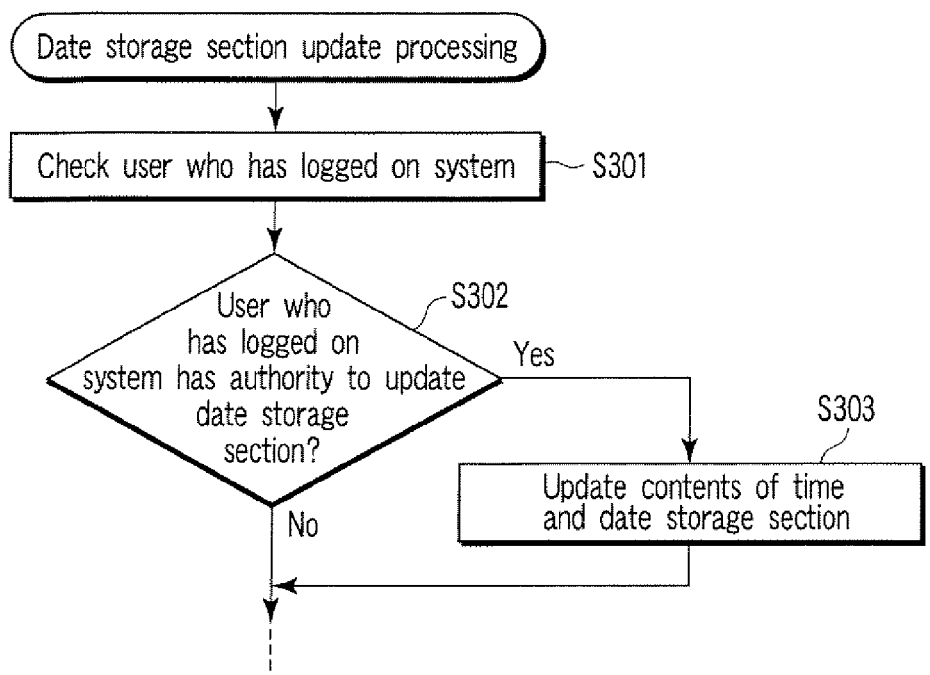
FIG. 12 is an exemplary flow chart showing a procedure of update processing of a time and date storage unit to be executed by the information processing apparatus of FIG. 1.

A flow chart of FIG. 12 shows a procedure of processing to be executed in the step S111 of FIG. 7.

When the utility program detects that the log-on authentication processing has been successful, the name of the user who has succeeded in the log-on authentication processing is acquired from the operating system (step S301). Then, the utility program checks whether or not the name of the user who has succeeded in the log-on authentication processing is present in the user name list, whereby it is judged whether or not the user who has succeeded in the log-on authentication processing is the user who has the authority to update the contents of the time and date storage unit 502A (step S302).

In a case where the user who has succeeded in the log-on authentication processing is the user who has the authority to update the contents of the time and date storage unit 502A (YES in the step S302), the utility program cooperates with the system BIOS to update the contents of the time and date storage unit 502A (step S303). On the other hand, in a case where the user who has succeeded in the log-on authentication processing is not the user who has the authority to update the contents of the time and date storage unit 502A (NO in the step S302), the processing of the step S303 is not executed. Therefore, even when the user succeeds in the log-on authentication processing, the value of the elapsed time D is not reset to zero, and the elapsed time D continues to be counted.

Even the user who does not know the user password can use the present computer 10 until a time elapsed from the last success of the log-on authentication exceeds a time limit. Therefore, the user who has the authority to update the contents of the time and date storage unit 502A is limited, whereby it can be prevented that a period when the first authentication processing is skipped is extended without any limitation.

Figure 13:
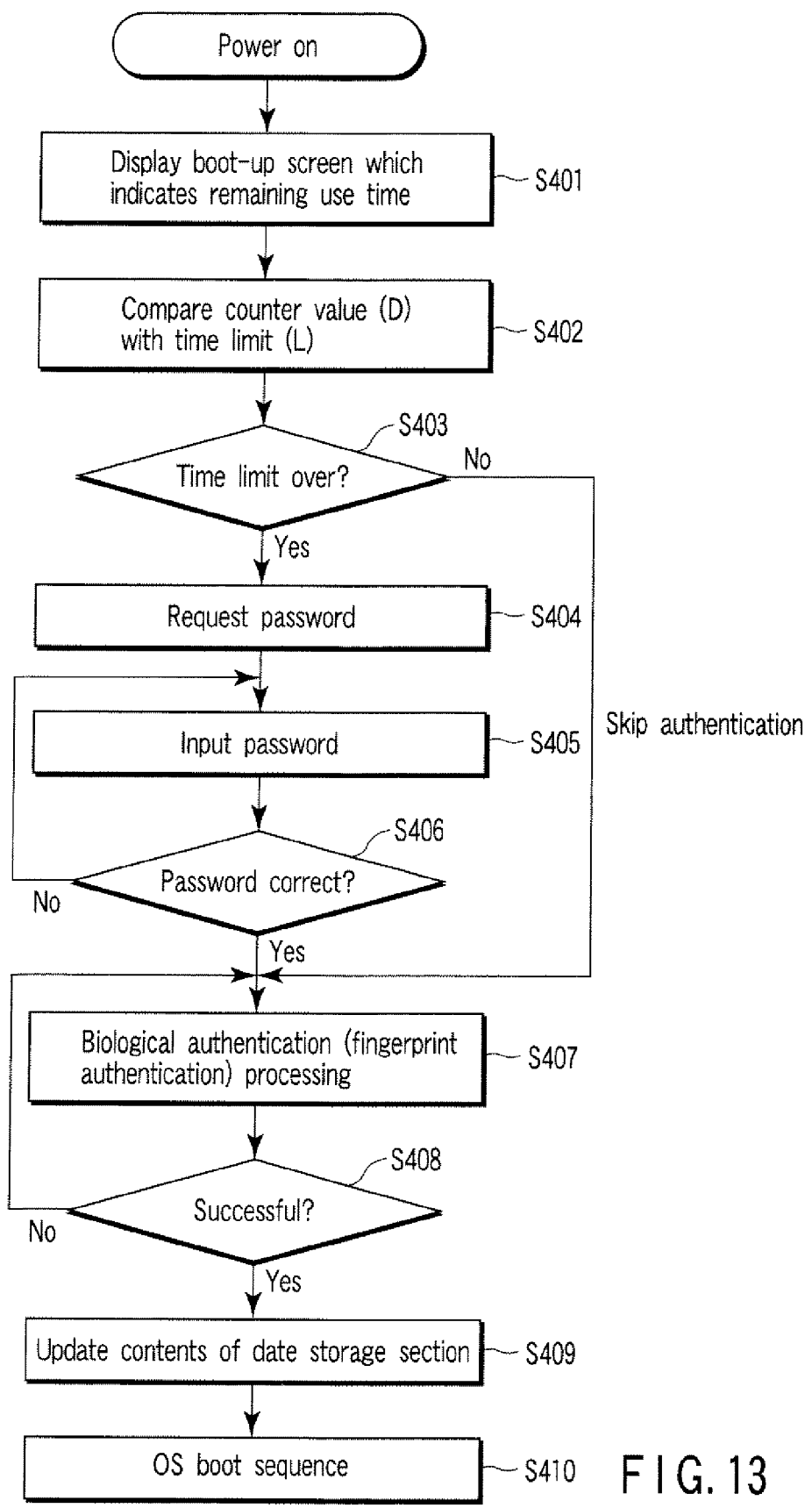
FIG. 13 is an exemplary flow chart showing another specific example of the procedure of the authentication control processing to be executed by the information processing apparatus of FIG. 1.

Next, another specific example of the procedure of the authentication control processing will be described with reference to a flow chart of FIG. 13. Here, it is assumed that the first authentication processing uses BIOS password authentication processing and that the second authentication processing is BIOS biological authentication processing.

When the power of the present computer 10 is turned on, the system BIOS first displays, in the LCD 121, the boot-up screen which indicates the remaining use time (the number of the remaining use days) of the present computer 10 (step S401). After the boot-up screen is displayed, the system BIOS acquires the calculated value of the time and date processing unit 502 to compare the calculated value D of the time and date processing unit 502 with the time limit L (step S402). According to the comparison result of the calculated value D of the time and date processing unit 502 with the time limit L, the system BIOS judges whether or not the time elapsed from the last success of the second authentication processing (here, the BIOS biological authentication processing) exceeds the time limit L (step S403).

In a case where the time elapsed from the last success of the second authentication processing exceeds the time limit L (YES in the step S403), the system BIOS displays, in the LSD 121, an authentication screen which requests the input of the user password to execute the first authentication processing, and the user is requested to input the user password (step S404). In this authentication screen, a text message (PASSWORD=) which requests the input of the user password is displayed.

When the user types and inputs the user password (step S405), the system BIOS compares the typed and input user password with the registered user password to judge whether or not the typed and input user password is correct (step S406).

When the typed and input user password matches with the registered user password, that is, when the typed and input user password is correct (YES in the step S406), the system BIOS advances to execution of the BIOS biological authentication processing of step S407.

On the other hand, in a case where the time elapsed from the last success of the second authentication processing does not exceed the time limit L (NO in the step S403), the system BIOS skips the steps S404, S405 and S406 and advances to the step S407 in order to omit the execution of the first authentication processing.

In the step S407, in order to execute the BIOS biological authentication processing, the system BIOS displays an authentication screen which requests input of the fingerprint in the LCD 121 to request the user to input the fingerprint. When the user's fingerprint is input from the fingerprint sensor 16, the system BIOS compares the fingerprint registered beforehand in the present computer 10 with the user's fingerprint input by the user using the fingerprint sensor 16 to judge whether or not the input fingerprint is correct (step S408).

When the input fingerprint is correct (YES in step S408), the system BIOS updates the contents of the time and date storage unit 502A (step S409). Afterward, the system BIOS starts the boot sequence for booting the operating system (step S410).

The execution of the BIOS password authentication processing is skipped until the time elapsed from the last success of the BIOS biological authentication processing exceeds the time limit. Therefore, the user can use the present computer 10 only by a simple operation of touching the fingerprint sensor 16 with a finger.

As described above, in the present embodiment, the execution of the first authentication processing is skipped until the predetermined period elapses from the last success of the second authentication processing. After the elapse of the predetermined period from the last success of the second authentication processing, control of executing the first authentication processing is done. In consequence, illegal use of the present computer 10 can be prevented without incurring deterioration of the usability.

Some examples other than the above-mentioned example in which the time information of the 2nd RTC 120 is used in a securing application will hereinafter be described.

A function capable of invalidating the BIOS password on time by referring to the 2nd RTC 120, even in a case where the BIOS password which is valid only for a certain time is added as a function and the time of the 1st RTC 201 is rewritten.

With regard to start (a function of turning on the system at a predetermined time) of alarm at the 2nd RTC 120, since access to the second RTC is strictly managed, it can be judged that the start is based on "manager's request". That is, in this case, "the time" is a token (a key), and the system may be booted without any input of the BIOS password (by skipping the input). When the BIOS password is skipped in this manner, a function of tracking a stolen PC can be intensified.

For example, even in a case where the PC is turned on with remote control by use of a mobile communication function or the like in order to track the stolen PC, when the boot is stopped by the BIOS password function, the PC cannot remotely be operated. The system is periodically safely be turned on with the 2nd RTC 120, and the BIOS password is skipped, so that the stolen PC can be tracked.

A function of erasing a file at a certain time or the like. Time management of the file and HDD data.

In a case where there is created a function such as a flight recorder of an airplane which checks the use of the system, for example, a time when the power supply is turned on and whether or not there is an access to the file of HOD, time information left in a log of the function has to be reliable. In this case, the 2nd RTC 120 is utilized.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
    a processor which executes an operating system and an application;
    a first real time clock including a function of supplying time and date information to the operating system at a time when the operating system is booted, and an alarm function of booting the operating system at a set time and date;
    a second real time clock including a function of measuring a time and date; and
    a time and date information transmission processing unit which executes authentication processing and which executes processing of information to change the time and date measured by the second real time clock in a case where the authentication processing has been successful.

2. The information processing apparatus according to claim 1, which further comprises:
    an input unit; and
    a storage unit in which password information is stored,
    wherein the authentication processing compares a password input from the input unit with the password information stored in the storage unit.

3. The information processing apparatus according to claim 1, which further comprises:
    a first battery to drive the first real time clock; and
    a second battery to drive the second real time clock.

4. The information processing apparatus according to claim 1, which further comprises:
    a controller to perform communication with the second real time clock,
    wherein the processor executes a basic input and output system (BIOS), and
    the operating system and the application acquire the time and date from the second real time clock via the basic input and output system and the controller.

5. A time and date information change method for a second real time clock of an information processing apparatus including a processor which executes an operating system and an application, a first real time clock having a function of supplying time and date information to the operating system at a time when the operating system is booted and an alarm function of booting the operating system at a set time and date, and the second real time clock having a function of measuring a time and date, the method comprising:
    executing authentication processing;
    transmitting information to update the time and date information to the second real time clock in a case where the authentication processing has been successful; and
    changing the time and date information of the second real time clock based on the transmitted information.

6. The time and date information change method according to claim 5, wherein the information processing apparatus further includes an input unit, and a storage unit where password information is stored, and
    the authentication processing compares a password input from the input unit with the password information stored in the storage unit.

7. The time and date information change method according to claim 5, wherein the information processing apparatus further includes a first battery to drive the first real time clock, and a second battery to drive the second real time clock.

8. The time and date information change method according to claim 5, wherein the information processing apparatus further includes a controller to perform communication with the second real time clock, the processor executes a basic input and output system (BIOS), and the operating system and the application acquire the time and date from the second real time clock via the basic input and output system and the controller.

9. An information processing apparatus comprising:

a processor adapted to execute an operating system and an application;

a first real time clock to (i) supply time and date information to the operating system at a time when the operating system is booted, and (ii) boot the operating system at a set time and date;

a second real time clock including a function of measuring a time and date;

a time measurement processing unit that is configured to alter the time and date measured by the second real time clock only after successful user authentication.

10. The information processing apparatus according to claim 9 further comprising:

an input unit; and a storage unit in which password information is stored, wherein the user authentication comprises a comparison between a password input from the input unit with the password information stored in the storage unit.

11. The information processing apparatus according to claim 9 further comprising:

a first battery to drive the first real time clock; and a second battery to drive the second real time clock.

12. The information processing apparatus according to claim 9, wherein the first battery is separate from the second battery.

13. The information processing apparatus according to claim 9, further comprising:

a controller in communications with the second real time clock, wherein the processor executes a basic input and output system (BIOS), and the operating system and the application acquire the time and date from the second real time clock via the BIOS and the controller.

14. The information processing apparatus according to claim 9, wherein the processor executes a system basic input and output system (BIOS) that performs the user authentication.

15. The information processing apparatus according to claim 14, after the user authentication is performed by the system BIOS upon comparing input authenticating information with stored authenticating information and determining a match between the input authenticating information and the stored authenticating information.

16. The information processing apparatus according to claim 15, wherein the input authenticating information includes a password input via a keyboard.

17. The information processing apparatus according to claim 15, wherein the input authenticating information includes fingerprint information supplied from a fingerprint sensor.

18. The information processing apparatus according to claim 15, wherein the input authenticating information includes an authentication code supplied from a time and date information change tool.

* * * * *